United States Patent [19]

Takano

[11] 4,108,292

[45] Aug. 22, 1978

[54] CLUTCH APPARATUS

[76] Inventor: Hazime Takano, 9-15, 4-chome, Kamihozumi, Ibaragi City, Osaka Pref., Japan

[21] Appl. No.: 752,664

[22] Filed: Dec. 20, 1976

[30] Foreign Application Priority Data

Dec. 21, 1975 [JP] Japan .............................. 50/153129
Jun. 30, 1976 [JP] Japan ................................ 51-78087

[51] Int. Cl.$^2$ ...................... F16D 13/76; F16D 67/00
[52] U.S. Cl. ............................................................ 192/11
[58] Field of Search ......................................... 192/11

[56] References Cited

U.S. PATENT DOCUMENTS

| | | | |
|---|---|---|---|
| 2,678,602 | 5/1954 | Kunz | 192/11 |
| 3,367,459 | 2/1968 | Rubin | 192/11 |
| 3,539,040 | 11/1970 | Edwards | 192/11 |
| 3,570,637 | 3/1971 | Pitman | 192/11 |

Primary Examiner—Lloyd L. King

[57] ABSTRACT

This invention relates to a clutch apparatus provided with a driving pulley and a driven pulley in a pair and around which a belt is positioned and a movable tension pulley is disposed between the two pulleys. When power is transmitted, the tension pulley is advanced to impart the required tension to the belt for transmission of power and when power transmission is discontinued, the tension pulley is retracted to loosen the belt, which is forced out toward the outer side of driving and driven pulleys so that it is disengaged from the two pulleys due to its own elasticity.

4 Claims, 13 Drawing Figures

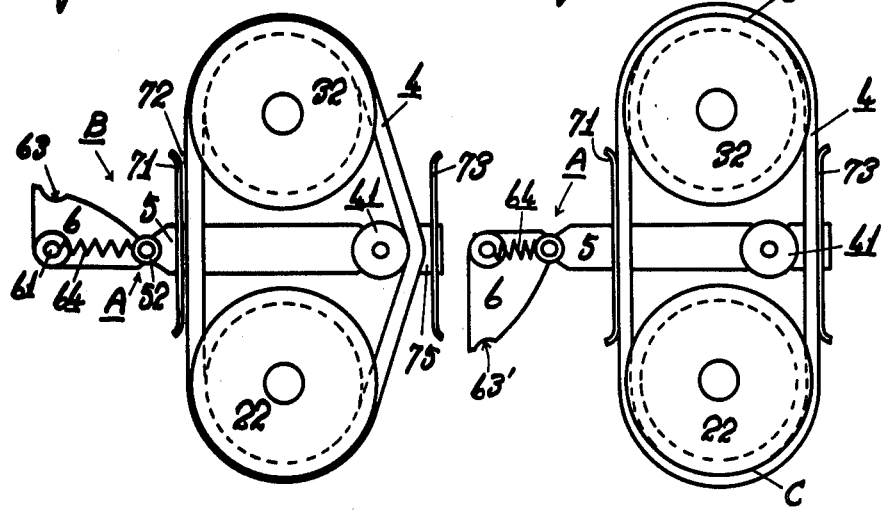
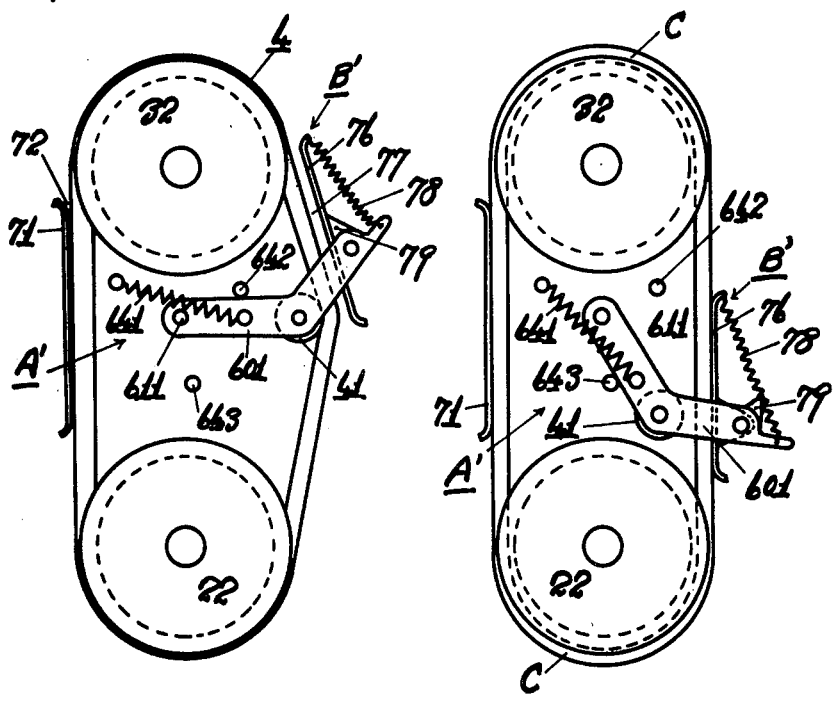

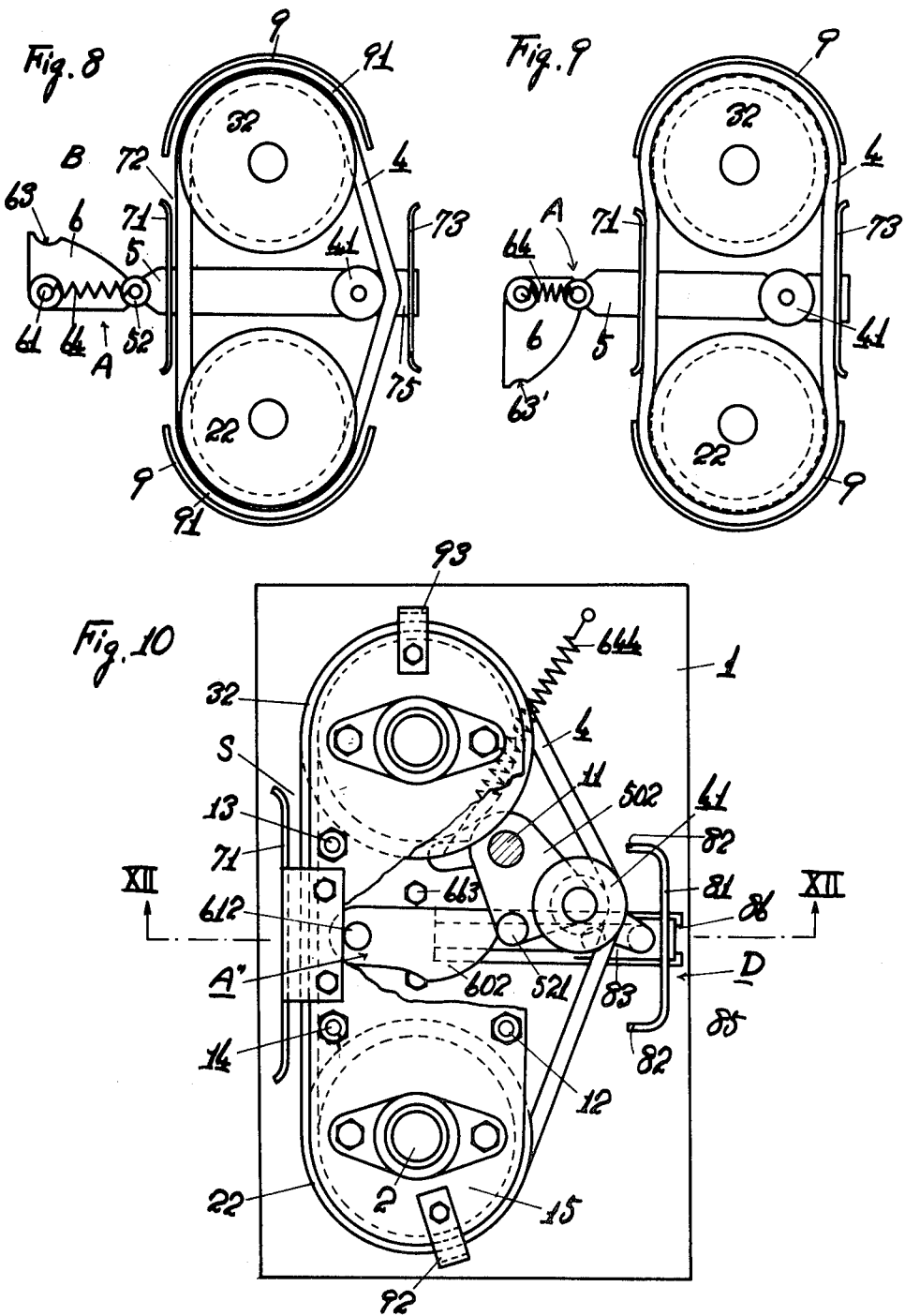

CLUTCH APPARATUS

BACKGROUND OF THE INVENTION

This invention relates to a clutch apparatus whereby power transmission and discontinuance thereof are effected.

Conventionally, a clutch apparatus uses mechanical systems to transmit power, such as a system using a friction disc, a system employing claws, etc. or an electrical system utilizing the attracting force of magnet. These systems, however, are complicated in construction and require high precision, with the result that they are costly and often break down.

SUMMARY OF THE INVENTION

An object of the present invention is to provide a clutch apparatus which has a simple in construction and is easy to repair.

Another object of the present invention is to provide a clutch apparatus whereby power transmission and discontinuance thereof are effected accurately.

A still another object of the present invention is to provide a novel clutch apparatus comprising a driving pulley and a driven pulley which a belt is laid, and a movable tension pulley is disposed between the two pulleys, whereby power transmission is effected by advancing said tension pulley and by giving the belt a tension necessary for drawing it against both the driving pulley and the driven pulley, and power transmission is discontinued by retracting the tension pulley to loosen the belt and by controlling the bulging of of the belt caused by its own elasticity between the two pulleys so that the belt will be forced out toward the outer side of the both pulleys and disengaged from each pulley.

BRIEF EXPLANATION OF THE DRAWINGS

The nature and advantages of the present invention will be understood more clearly from the following description made with reference to the accompanying drawings, in which:

FIG. 1 to FIG. 5 show respectively a first embodiment of the present invention, of which FIG. 1 is a plan view of the apparatus according to the present invention; FIG. 2 is a side view of the apparatus shown in FIG. 1; FIG. 3 is a cross section of the apparatus, taken on line III — III in FIG. 1; FIG. 4 is a diagram illustrating the operation of power transmission; and FIG. 5 is a diagram illustrating the operation when power transmission is discontinued. P FIG. 6 and FIG. 7 show respectively a second embodiment of the present invention, of which FIG. 6 is a diagram illustrating the operation for transmission of power; and FIG. 7 is a diagram illustrating the operation when power transmission is discontinued.

FIG. 8 and FIG. 9 show respectively a third embodiment of the present invention, of which FIG. 8 is a diagram illustrating the operation when power is transmitted and FIG. 9 is a diagram illustrating the operation when power transmission is discontinued.

FIG. 10 to FIG. 13 show respectively a fourth embodiment, of which FIG. 10 is a plan view of the apparatus; FIG. 11 is a side view of the apparatus shown in FIG. 10; FIG. 12 is a cross section of the apparatus shown in FIG. 10, taken on line XII — XII; and FIG. 13 is a diagram illustrating an outline of how to discontinue the power transmission.

DETAILED DESCRIPTION OF THE INVENTION

Figure 1:
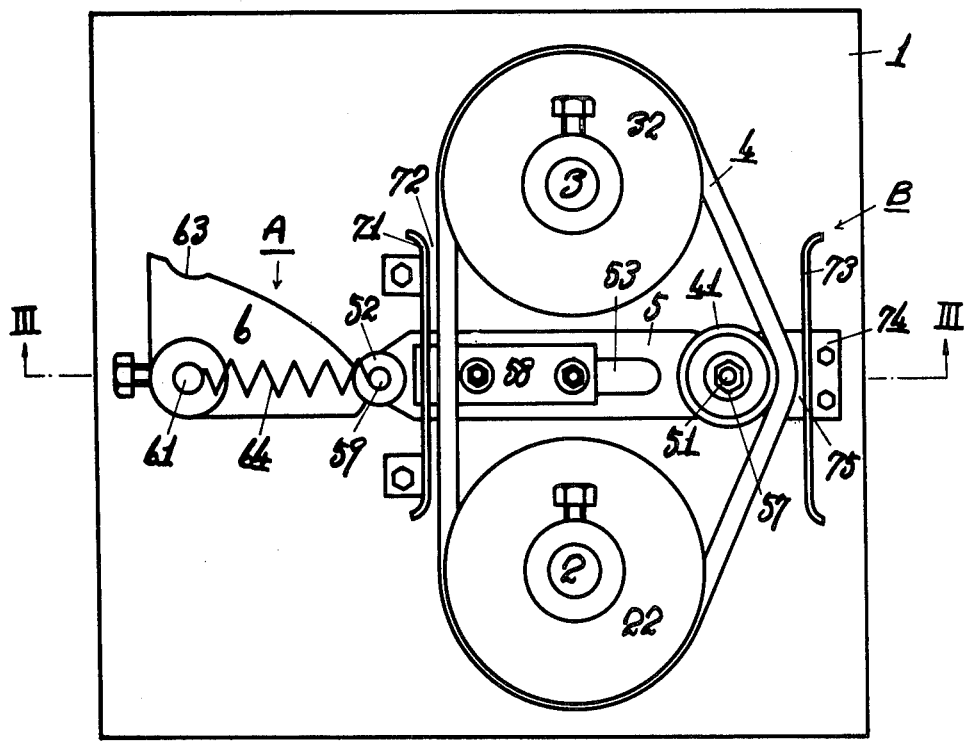
Figure 3:
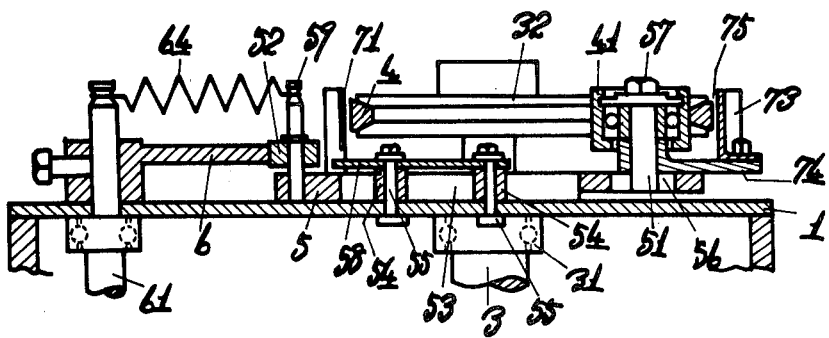

Referring now to the first embodiment shown in FIG. 1 to FIG. 5, a motive power shaft 2 and a driven shaft 3 are supported rotatably in a base 1 by means of bearings 21 and 31, parallel with each other and with a space therebetween. A driving pulley 22 and a driven pulley 32 are secured respectively to the end portions of shafts 2 and 3 projecting from the base 1. A V-belt 4 is placed around these pulleys and a tension pulley 41 is provided between the pulleys 22 and 32 and engagable with the V-belt 4. By imparting the required tension to the V-belt 4, rotation of the motive power shaft 2 is transmitted to the driven shaft 3.

By means of a shifting means A provided between the pulley 22 and the pulley 32, the above-described tension pulley 41 is advanced so as to engage and bend the V-belt 4, thereby giving it the tension necessary for power transmission, or is retracted to loosen the belt for discontinuing power transmission. In this embodiment, the shifting means A has a construction wherein the tension pulley 41 is mounted rotatably on a sliding plate 5 which is shifted by means of a cam plate 6. At an end portion of the sliding plate 5 is a slide groove 56, into which a pin 51 on which is rotatably mounted the tension pulley. The position of pin 51 along said slide groove is set according to the length of the V-belt 4 and is fixed by means of a nut 57. This is to cope with the tolerance in the length of the V-belt and therefore when a new V-belt is provided or when the V-belt is elongated while in use, proper adjustment of pin 51 can be made along the slide groove. At the other end of the slide plate 5, a cam roller 52 is supported. In the central part of the slide plate 5 is a slot 53, in which a pair of rollers 54 mounted on the base 1 are positioned and are spaced along slot 55 in a direction at right angles to the V-belt 4. Supporting shafts 55 for said rollers 54 are provided with a top plate 58 to cover the sliding plate 5 so that the sliding plate 5 is allowed to shift in the direction at right angle to the V-belt for a limited distance.

Figure 2:
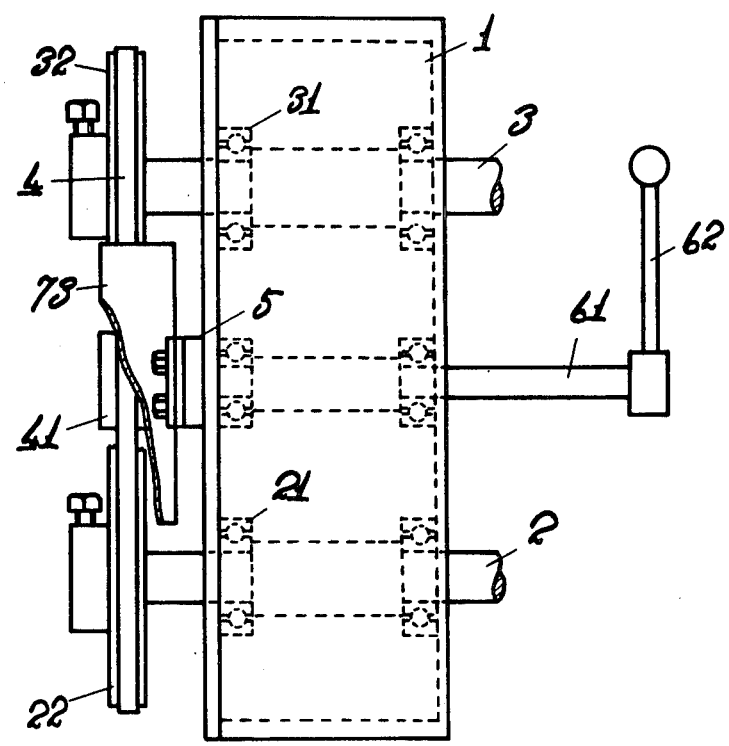
Figure 11:
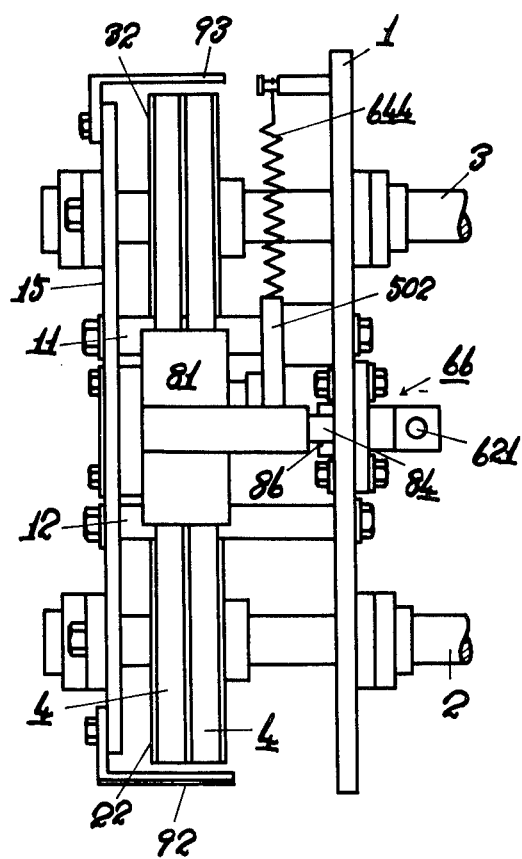
Figure 12:
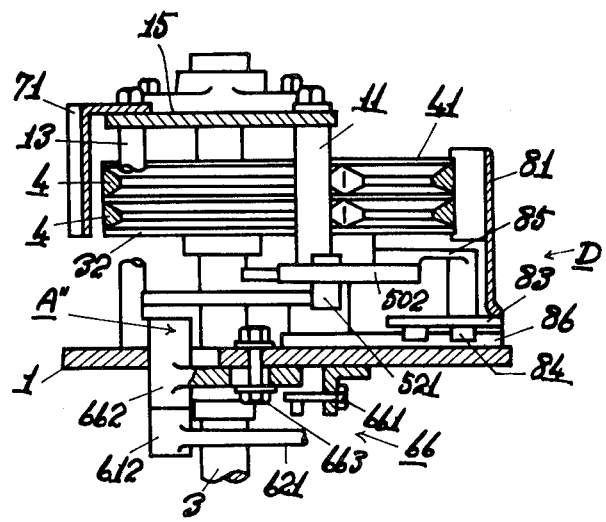
Figure 13:
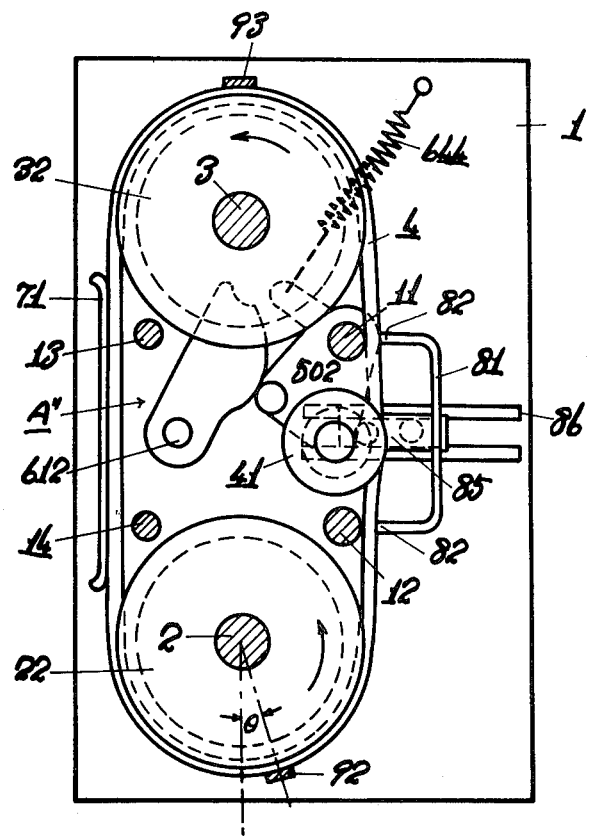

The afore-mentioned cam roller 52 is engaged by a cam plate 6 fitted to the end of an operating shaft 61 which is supported rotatably on the base 1 and has a handle 62 (FIG. 2). Fixed between said operating shaft 61 and a pin 59 on which said cam roller 52 is mounted a traction spring 64 which urges the cam roller 52 against the cam plate 6. This cam plate 6 is triangularly shaped as shown in FIG. 1. It presses on the cam roller 52 with the longer side thereof to advance the tension pulley 41, thereby pressing the V-belt with the required pressure, and the spring 64 draws the pulley 41 toward the shorter side of cam plate 6. Concave recesses 63 and 63' are provided in the cam plate 6 to fix the cam roller in the respective positions.

In order to hold the V-belt 4 when the afore-mentioned pulley 41 is retracted, a holding means B, comprising mainly a stationary back plate 71 and a movable back plate 73, is provided outside the V-belt and in parallel with the straight line portion of the V-belt. The stationary back plate 73 is supported by a setting plate 74 fixed at the end of the sliding plate 5, parallel with the stationary back plate 71, in such a fashion that the V-belt is sandwiched between the movable back plate and the tension pulley 41, with a slight space 75 left between the movable back plate and the V-belt 4. As shown in FIG. 4, when power is transmitted the sliding plate 5 advances so as to engage and bend the V-belt, thereby imparting the necessary tension to the V-belt. At this time, neither of the back plates 71 and 73 are in contact with the V-belt. When power transmission is discontinued, the sliding plate 5 is retracted, as shown in FIG. 5, and the tension pulley is disengaged from the V-belt 4, whereby the V-belt is loosened and tends to bulge out due to its own elasticity and centrifugal force resulting from rotation but is checked by the two back plates 71 and 73 and thus is pushed out toward the outer side of the two pullies 22 and 32, in other words, the V-belt separates from the surface at which pulleys 22 and 32 contact the belt and bulges. In this case, the amount of bulging C is related to the extent of loosening of the V-belt 4, the length of the two back plates and the space between the two back plates. By properly selecting these elements the V-belt is caused to be positioned off the pitch circle of either one or both of the driving pulley and the driven pulley and thus the driving pulley runs idle and power transmission is discontinued. In this case, if the two back plates 71 and 73 are coated with a substance having a large frictional force, such as brake lining, at the surface at which they makes contact with the V-belt, braking action is applied to the belt, producing an increased braking effect.

FIG. 6 and FIG. 7 show the second embodiment, in which a lever mechanism is employed as the means of shifting the tension pulley 41. The shifting means A' comprises a lever 601 with its one end secured to an operating shaft 611 having a handle (not shown in the drawing) and with the tension pulley 41 for tensioning or loosening the V-belt 4 supported at a central portion thereof, a snap motion mechanism 641 which places said lever 601 in a position to press the roller 41 against the V-belt 4 (FIG. 6) and in a position to disengage the roller 41 from the V-belt 4 (FIG. 7), and support pins 642 and 643 which limit the movement of the lever 601 in each position. The V-belt holding means B' has the stationary back plate 71 mounted on the tension side of the V-belt with a slight space 72 left therebetween; a movable back plate 76 is rotatably mounted on the free end of the lever 601; said back plate 76 is pressed against a claw 79 on lever 601 by means of a spring 78 so that a slight space 77 is provided between the back plate and the belt 4, while the tension pulley 41 is in contact with the V-belt 4; when the tension pulley 41 is in a disengaged position, the movable back plate 76 is pressed against the V-belt 4, pivoting against the tension of spring 78, and thus checks the V-belt and bulges (C) it toward the outer side of the V-pulleys.

FIG. 8 and FIG. 9 show an embodiment similar to FIGS. 1–5 in which a cover 9 for controlling the bulging of the V-belt is provided. Said cover is disposed in such a fashion that when power is transmitted (FIG. 8), namely, while the V-belt is tensioned against the V-pulleys 22 and 32, it surrounds the belt semicircularly with a space 91 being left therebetween and when power transmission is discontinued (FIG. 9), namely, when the V-belt bulges, it checks bulging and holds the V-belt concentrically and in a larger diameter than the pitch circle of the V-belt.

Referring to the fourth embodiment as shown in FIG. 10 - FIG. 13, this embodiment shows a construction in which a control means on the belt is provided additionally.

Spacers 11, 12, 13, 14 are secured to the base 1 to support a cover plate 15 spaced from the base 1. The driving pulley 22 and the driven pulley 32, which are fixed to the driving shaft 2 and the driven shaft 3 respectively, are supported rotatably between the base and the cover plate. The V-belt is placed around these pulleys and a tension pulley 41 is disposed adjacent the V-belt. This tension pulley 41 is adapted to be advanced by means of a shifting means A" provided between the pulleys 22 and 32 so as to press against the V-belt and gives it a tension necessary for power transmission or to retract it so as to loosen the V-belt for discontinuing power transmission. In this embodiment, the shifting means comprises mainly an operating cam plate 602 secured to a shaft 612 which is rotated by means of an operating handle 621 and a support plate 502 of triangular shape on which the tension pulley 41 rotatably mounted and which is provided with a cam roller 521 which contacts with the afore-mentioned cam plate 602. The support plate 502 is rotatably mounted on the spacer 11 supporting the cover plate 15 and is urged, by means of a spring 644 connected thereto, to press the cam roller 521 against the cam plate 602. By the rotation of the cam plate 602, the support plate 502 is forced to rotate against the tension of spring 644 and advances the tension pulley 41 (FIG. 1) to give the required tension to the V-belt 4. By rotating the cam plate 602 counterclockwise, the support plate 502 is rotated clockwise by means of the spring 644 (FIG. 4) and the tension pulley is retracted to loosen the V-belt 4.

When the tension pulley 41 retracts, in order to disengage the V-belt from the both pulleys 22 and 32 by utilizing the elasticity of the V-belt itself, the stationary back plate 71 is disposed on the belt tension side (on the opposite side of the belt run from the tension pulley), a V-belt controlling and holding means D is provided on the side of the belt run engaged by the tension pulley.

This controlling and holding means D mainly comprises a U-shaped braking piece 81, spacers 11 and 12 which act as abutment members to support the V-belt against the urging of leg portions 82 at both ends of said braking piece 81, a sliding plate 83 carrying the braking piece 81 and connected with the support plate 502 by a connecting rod 85, and a guide rod 86 which is disposed in a direction at right angles to an axial line connecting pulleys 22 and 32 and in which is fixed a guide roller 84 below the afore-mentioned sliding plate 83.

The afore-mentioned braking piece 81 is in a U-shape for holding the V-belt 4 and has a space between its two end legs 82 which corresponds to the spacing of spacers 11 and 12. Therefore, a proper space is left between the belt contact area of the tension pulley 41 and the inside of the braking piece 81, with the result that exchange of belts can be carried out easily. Moreover, since the belt is held at two points while power transmission is discontinued, i.e., leg portions 82 at both ends of the braking piece 81 and spacers 11, 12, the belt is prevented from being disconnected from the tension pulley 41 and when power transmission is started, the belt will be returned into the groove of the pulley.

Numeral 66 denotes an adjuster for the cam plate 602 provided as part of the tension pulley shifting means A". This adjuster provides for an adjustment to accommodate differences in the lengths of the V-belt by shifting the cam plate 602. When adjusting the cam plate 602, the belt is either stretched or loosened by shifting the bracket supporting the handle shaft 612 by means of an adjusting screw 661 fitted on the base 1 at a proper place and then a bracket 662 is secured to the base 1 by means of a binding bolt 663. Numerals 92 and 93 denote plates for controlling the bulging of the belt, provided for the driving and driven pulleys 22 and 32 with a space left therebetween. As will be mentioned hereinafter, they control excessive bulging of the belt which is being loosened and make the belt bulge concentrically with each pulley. By biassing ($\sigma$) the control plate 92 slightly in a direction opposite to the rotational direction of the belt, bulging of the belt can be checked and the belt is maintained concentrically with the pulley with a space left therebetween while power transmission is discontinued. When power is transmitted, the cam plate 602 is rotated by means of the operating handle 621 to press the cam roller 521 and rotate the support plate 502. Then, the V-belt 4 is tensioned by means of the tension pulley 41 commence power transmission. When power transmission is discontinued, by rotating the operating cam plate 602 counterclockwise the support plate 502 is rotated clockwise by means of the spring 644, whereby the tension pulley 41 is retracted and the V-belt is loosened. At the same time, the braking piece 81 is advanced, accompanied by the support plate 502, and makes contact with the V-belt 4 and thus presses and holds the V-belt, by means of the spring 644, between spacers 11 and 12 in the most loosened state, namely, in a straight line obtained by connecting the edges of the two pulleys 22 and 32. In this case, the V-belt 4 will bulge toward the outside of the tension pulley 41 with the loosening of the belt, but such bulging is checked by the afore-mentioned stationary back plate 71. Thus, loosening of the V-belt results in its bulging toward the outer side of the two pulleys. The amount of bulging at this time, namely, the diameter of the circular arc formed at each of the pulleys 22 and 32, is related to the extent of loosening of the V-belt. By making a proper selection of this factor, a circular arc of a larger diameter is formed and thus power transmission is discontinued.

The foregoing embodiments describe the use of a single V-belt but can be adapted for a plurality of V-belts and also for a flat belt, a cog belt and the like. In the above embodiments, the braking means is provided on one side of the V-belt and the stationary back plate on the other side but said stationary back plate may be replaced by braking and holding means as such modifications of these means can be made, without departing from the spirit of the present invention.

What is claimed is:

1. A clutch apparatus comprising a driving pulley, a driven pulley spaced laterally from said driving pulley, a belt loosely engaged around said pulleys and having a length sufficient for causing the belt to be completely spaced from the peripheries of said driving and driven pulleys when the runs of the belt between the driving and driven pulleys are straight and substantially tangential to the peripheries of the driving and driven pulleys, a tension pulley, shifting means on which said tension pulley is mounted and movable generally transverse to the line between the axes of said driving and driven pulleys in one direction with the tension pulley in engagement with one of the runs of said belt for tensioning said belt into engagement with said driving and driven pulleys and movable in the opposite direction for releasing the tension on said belt, and belt holding means positioned along the outer side of the belt runs between the driving and driven pulleys when said tension pulley is moved to a position for releasing the tension on the belt for holding the runs of the belt between the driving and driven pulleys substantially straight and tangential to the peripheries of said driving and driven pulleys, whereby the portions of the belt moving along said runs are prevented from bulging outwardly relative to the circumference of the belt and portions of said belt moving around the driving and driven pulleys are caused to bulge outwardly relative to said driving and driven pulleys and be completely disengaged therefrom.

2. A clutch apparatus as claimed in claim 1 in which said holding means comprises a stationary holding plate positioned along the other run of said belt and spaced slightly from the belt when the belt is tensioned, and a movable plate connected with said shifting means for moving into engagement with said one run of said belt when said shifting means moves said tension pulley in the tension releasing direction.

3. A clutch apparatus as claimed in claim 1 further comprising belt bulging control means positioned around the portions of the peripheries of said driving and driven pulleys which are remote from each other and concentric with the pulleys and on a pitch circle having a diameter larger than the diameter of the respective driving and driven pulleys.

4. A clutch apparatus as claimed in claim 1 in which said holding means comprises a stationary holding plate positioned along the other run of said belt and spaced slightly from the belt when the belt is tensioned, and a movable U-shaped member connected to said shifting means with the ends of the U-shaped member toward said belt and movable into engagement with said one run of said belt when said shifting means moves said tension pulley to the limit of the movement in the tension releasing direction, and abutment members on the inside of the belt at positions opposed to the ends of said U-shaped member and against which the belt is urged by said ends of said U-shaped member when the shifting means moves said tension pulley to the limit of the movement in the tension releasing direction, whereby the belt is held and braked between the U-shaped member and said abutment members.

* * * * *